United States Patent
Sakaitani et al.

(10) Patent No.: US 11,170,457 B2
(45) Date of Patent: Nov. 9, 2021

(54) TRANSACTION MANAGEMENT METHOD, COMMUNICATION TERMINAL, AND METHOD OF EXPLOITATION RIGHT MANAGEMENT

(71) Applicant: ARTRIGGER INC., Tokyo (JP)

(72) Inventors: Madoka Sakaitani, Tokyo (JP); Kenichi Mogi, Tokyo (JP)

(73) Assignee: ARTRIGGER INC., Tokyo (JP)

(*) Notice: Subject to any disclaimer, the term of this patent is extended or adjusted under 35 U.S.C. 154(b) by 51 days.

(21) Appl. No.: 16/830,290

(22) Filed: Mar. 26, 2020

(65) Prior Publication Data

US 2020/0226702 A1 Jul. 16, 2020

Related U.S. Application Data

(63) Continuation of application No. PCT/JP2018/035909, filed on Sep. 27, 2018.

(30) Foreign Application Priority Data

Sep. 27, 2017 (JP) .............................. JP2017-186786
Jun. 12, 2018 (JP) .............................. JP2018-112157

(51) Int. Cl.
*G06Q 50/18* (2012.01)
*G06F 16/23* (2019.01)
(Continued)

(52) U.S. Cl.
CPC ....... *G06Q 50/184* (2013.01); *G06F 16/2379* (2019.01); *G06Q 20/065* (2013.01);
(Continued)

(58) Field of Classification Search
CPC .............. G06Q 50/184; G06Q 20/065; G06Q 20/1235; G06Q 20/3678; G06Q 20/4014;
(Continued)

(56) References Cited

U.S. PATENT DOCUMENTS 8,160,932 B2 4/2012 Shii
2010/0223156 A1 9/2010 Shii
(Continued)

FOREIGN PATENT DOCUMENTS

JP 2000-132620 A 5/2000
JP 2005-100447 A 4/2005
(Continued)

OTHER PUBLICATIONS

Sweatman, "The Building Blocks of Digital Art Marketing: A Market Analysis of the Digital Art Market and its Application to Blockchain Technology", Dec. 12, 2017, Master's Thesis at Sotheby's Institute of Art, 84 pages (Year: 2017).*
(Continued)

*Primary Examiner* — James D Nigh
(74) *Attorney, Agent, or Firm* — Hauptman Ham, LLP

(57) ABSTRACT

An acquisition part acquires a blockchain in which a plurality of blocks are linked, the blocks store (i) creator information for identifying a creator of a work, (ii) rule information for establishing transaction rules of the work, (iii) information relating to a virtual currency used for a transaction of the work, and (iv) a transfer history of the work and information relating to an exploitation right which is a right established for the work and allows others to use the work. A license information specification part specifies a grantor and a license fee of the exploitation right. A received amount transfer part subtracts a creator's receiving amount from a balance of the virtual currency associated with the grantor, and adds the creator's receiving amount to a balance of the virtual currency associated with a person or management organization designated by the creator of the work.

9 Claims, 11 Drawing Sheets

(51) Int. Cl.
*G06Q 20/06* (2012.01)
*G06Q 20/12* (2012.01)
*G06Q 20/36* (2012.01)
*G06Q 20/40* (2012.01)

(52) U.S. Cl.
CPC ..... *G06Q 20/1235* (2013.01); *G06Q 20/3678* (2013.01); *G06Q 20/405* (2013.01); *G06Q 20/4014* (2013.01); *G06Q 2220/18* (2013.01)

(58) Field of Classification Search
CPC .............. G06Q 20/405; G06Q 2220/18; G06F 16/2379
USPC .......................................................... 705/59
See application file for complete search history.

(56) References Cited

U.S. PATENT DOCUMENTS

| | | | |
|---|---|---|---|
| 2016/0323109 A1* | 11/2016 | McCoy | G06Q 20/1235 |
| 2017/0116693 A1* | 4/2017 | Rae | H04L 9/3236 |
| 2017/0221029 A1 | 8/2017 | Lund et al. | |
| 2018/0041571 A1* | 2/2018 | Rogers | G06Q 20/3827 |
| 2018/0241551 A1 | 8/2018 | Fujimura et al. | |
| 2018/0285996 A1* | 10/2018 | Ma | G06F 16/2428 |
| 2018/0294957 A1* | 10/2018 | O'Brien | H04L 9/0643 |
| 2018/0323964 A1 | 11/2018 | Watanabe et al. | |
| 2020/0143367 A1* | 5/2020 | LeBeau | H04L 9/3297 |

FOREIGN PATENT DOCUMENTS

| | | | | |
|---|---|---|---|---|
| JP | 2006-178547 A | 7/2006 | | |
| JP | 2009-48619 A | 3/2009 | | |
| JP | 2011-76407 A | 4/2011 | | |
| JP | 2012-3441 A | 1/2012 | | |
| JP | 2017-50763 A | 3/2017 | | |
| JP | 2017-91149 A | 5/2017 | | |
| JP | 2017-123116 A | 7/2017 | | |
| WO | WO-2017165910 A1 * | 10/2017 | ........... G06Q 10/083 |

OTHER PUBLICATIONS

Kentaro Toyoda et al., "A Blockchain-Based Products Ownership Management System for Anti-Counterfeits", Proceeding of the 2016 Computer Security Symposium, published on Oct. 4, 2016, pp. 696-703, vol. 2016, No. 2, ISSN: 1882-0840, Information Processing Society of Japan, Tokyo Japan, 10pp.

Daisuke Shimada et al., "Structure of block chain learned from now", Software design, published on May 18, 2017, pp. 80-90, serial No. 385, published No. 319, ISSN: 0916-6297, Japan, 14pp.

International Search Report in PCT Application No. PCT/JP2018/035909, dated Dec. 4, 2018, 9pp.

Written Opinion in PCT Application No. PCT/JP2018/035909, dated Dec. 4, 2018, 7pp.

Office Action in JP Application No. 2018-112157, dated Jul. 31, 2018, 8pp.

Office Action in JP Application No. 2017-186786, dated Feb. 27, 2018, 8pp.

Office Action in JP Application No. 2018-112157, dated Sep. 4, 2018, 6pp.

Written Opinion in PCT Application No. PCT/JP2018/035909, dated Dec. 4, 2018, 21pp.

* cited by examiner

TRANSACTION MANAGEMENT METHOD, COMMUNICATION TERMINAL, AND METHOD OF EXPLOITATION RIGHT MANAGEMENT

CROSS-REFERENCE TO RELATED APPLICATIONS

The present application is a continuation application of International Application number PCT/JP2018/035909, filed on Sep. 27, 2018, which claims priority under 35 U.S.C § 119(a) to Japanese Patent Applications No. 2017-186786, filed on Sep. 27, 2017, and No. 2018-112157, filed on Jun. 12, 2018. The contents of the above applications are incorporated herein by reference in their entirety.

BACKGROUND OF THE INVENTION

Technical Field

The present invention relates to a transaction management method, a method of exploitation right management, a communication terminal, and a program, in particular to a technique for managing distribution and use of works using a blockchain.

Recently, virtual currencies relying on blockchain technology are used more and more. The blockchain technology can also be regarded as a single distributed database technique in which a gigantic ledger recording the history of all transactions of participants is shared by all the participants. For this reason, it is conceivable to apply the blockchain technology to various transactions other than currency, and, for example, Japanese Unexamined Patent Application Publication No 2017-91149 has proposed to use the blockchain as evidence when a contract agreement is exchanged between individuals.

In Japan, once an author sells a work such as a painting, sculpture, or digital art to others, there is no legal mechanism for returning sales to the author when that work is resold in a subsequent secondary distribution. Therefore, if a work, which was sold at a low price by an artist before fame hit him/her, is subsequently valued up, the profit from the improved value of the work is rarely returned to the artist. Furthermore, if an owner of the work sold by the artist gains a profit by establishing an exploitation right that permits others to use the work, the profit is rarely returned to the artist who created the work. Under such circumstances, the economic benefits to authors are not guaranteed, and artistic activities of authors may be hindered.

The inventors of the present application have recognized a possibility of realizing a right, a so-called resale right, of the author to obtain a part of the sales amount and license fee each time the work is resold or each time the exploitation right is established for the work in the transaction of the work by using blockchain technology.

The invention focuses on these points, and an object of the present invention is to provide a technique for managing secondary distribution and use of works.

BRIEF SUMMARY OF THE INVENTION

A first aspect of the present invention is a transaction management method. In this method a processor executes: acquiring a blockchain in which a plurality of blocks are linked, the blocks store (i) creator information for identifying a creator of a work, (ii) rule information for establishing transaction rules of the work, (iii) information about a virtual currency used for a transaction of the work, and (iv) a transfer history of the work, and the blockchain is built on a communication network; specifying a current owner of the work from the transfer history; specifying an assignee of the work; accepting, from the creator of the work, a designation of a person or management organization which receives a payment of a creator's receiving amount, which is an amount obtained by multiplying a transfer price of the work by a ratio established in the transaction rules; changing a remittee established in a beneficiary's profit remittance clause, which establishes a remittance of the creator's receiving amount and is included in the rule information, to the person or management organization which receives the payment of the creator's receiving amount designated by the creator; adding information for specifying the current owner to assignor information for specifying an assignor and adding a new transfer history, in which information for specifying the assignee is added as assignee information, to the blockchain, on the condition that the transaction rules which establish procedures of (i) subtracting the creator's receiving amount, which is the amount obtained by multiplying the transfer price of the work by the ratio established in the transaction rules, from a balance of the virtual currency associated with the assignee and (ii) adding the creator's receiving amount to a balance of the virtual currency associated with the person or management organization designated by the creator of the work are executed; and broadcasting, via the communication network, a blockchain to which the transfer history of ownership of the work is added to a plurality of terminals participating in an update of the blockchain.

A second aspect of the present invention is a communication terminal capable of communicating with a plurality of terminals via a communication network. This terminal includes: an acquisition part that acquires a blockchain in which a plurality of blocks are linked, the blocks store (i) creator information for identifying a creator of a work, (ii) rule information for establishing transaction rules of the work, (iii) information about a virtual currency used for a transaction of the work, and (iv) a transfer history of the work, and the blockchain is built on the communication network; a specification part that specifies a current owner of the work from the transfer history and specifies an assignee of the work; a transfer executing part that adds information for specifying the current owner to assignor information for specifying an assignor and adds a new transfer history in which information for specifying the assignee is added as assignee information to the blockchain when procedures in accordance with the transaction rules are executed; and a history spreading part that broadcasts, via the communication network, a blockchain, to which the transfer history of ownership of the work is added, to a plurality of terminals participating in an update of the blockchain, wherein the transaction rules include a beneficiary's profit remittance clause that establishes a remittance of a creator's receiving amount, which is an amount obtained by multiplying a transfer price of the work by a ratio established in the transaction rules, to a person or management organization, which is a payment destination of the creator's receiving amount, designated by the creator of the work, and the transfer executing part accepts a designation of the person or management organization which receives a payment of the creator's receiving amount, and adds the new transfer history to the blockchain if the transaction rules which establish procedures of (i) subtracting the creator's receiving amount from a balance of the virtual currency associated with the assignee and (ii) adding the creator's receiving amount to a balance of the virtual currency associated with the person or management organization designated by the creator of the work are executed.

A third aspect of the present invention is a method of exploitation right management. In this method, a processor that can communicate with a plurality of terminals via a communication network executes: acquiring a blockchain in which a plurality of blocks are linked, the blocks store (i) creator information for identifying a creator of a work, (ii) rule information for establishing transaction rules of the work, (iii) information relating to a virtual currency used for a transaction of the work, and (iv) a transfer history of the work and information relating to an exploitation right which is a right established for the work and allows others to use the work, and the blockchain is built on the communication network; and; linking information relating to a new exploitation right to the blockchain, wherein the information relating to the exploitation right includes information of a grantor who granted the exploitation right, and the processor further executes: specifying, from the information relating to the exploitation right, a grantor and a license fee of the exploitation right established for the work; subtracting a creator's receiving amount, which is an amount obtained by multiplying the license fee by a ratio established in the transaction rules, from a balance of the virtual currency associated with the grantor, and adding the creator's receiving amount to a balance of the virtual currency associated with a person or management organization designated by the creator of the work, in accordance with the transaction rules established in the rule information; accepting, from the creator of the work, a designation of a person or management organization which receives a payment of the creator's receiving amount; and changing a remittee established in a beneficiary's profit remittance clause, which establishes a remittance of the creator's receiving amount and is included in the rule information, to the person or management organization which receives the payment of the creator's receiving amount designated by the creator.

A fourth aspect of the present invention is a communication terminal capable of communicating with a plurality of terminals via a communication network. This terminal includes: an acquisition part that acquires a blockchain in which a plurality of blocks are linked, the blocks store (i) creator information for identifying a creator of a work, (ii) rule information for establishing transaction rules of the work, (iii) information relating to a virtual currency used for a transaction of the work, and (iv) a transfer history of the work and information relating to an exploitation right which is a right established for the work and allows others to use the work, and the blockchain is built on the communication network; and a license information linking part that links information relating to a new exploitation right to the blockchain, wherein the information relating to the exploitation right includes information of a grantor who granted the exploitation right and a license fee of the exploitation right, and the communication terminal further includes a license information specification part that specifies, from the information relating to the exploitation right, a grantor and a license fee of the exploitation right established for the work; and a received amount transfer part that subtracts a creator's receiving amount, which is an amount obtained by multiplying the license fee by a ratio established in the transaction rules, from a balance of the virtual currency associated with the grantor, and adds the creator's receiving amount to a balance of the virtual currency associated with a person or management organization designated by the creator of the work, in accordance with the transaction rules established in the rule information, wherein the received amount transfer part accepts, from the creator of the work, a designation of a person or management organization which receives a payment of the creator's receiving amount and changes a remittee established in a beneficiary's profit remittance clause, which establishes a remittance of the creator's receiving amount and is included in the rule information, to the person or management organization which receives the payment of the creator's receiving amount designated by the creator.

It should be noted that any combination of the above-described constituent elements, and an aspect obtained by converting the expression of the present invention among methods, devices, systems, computer programs, data structures, recording media, and the like are also effective as an aspect of the present invention.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Outline of the Embodiments>

Figure 1:
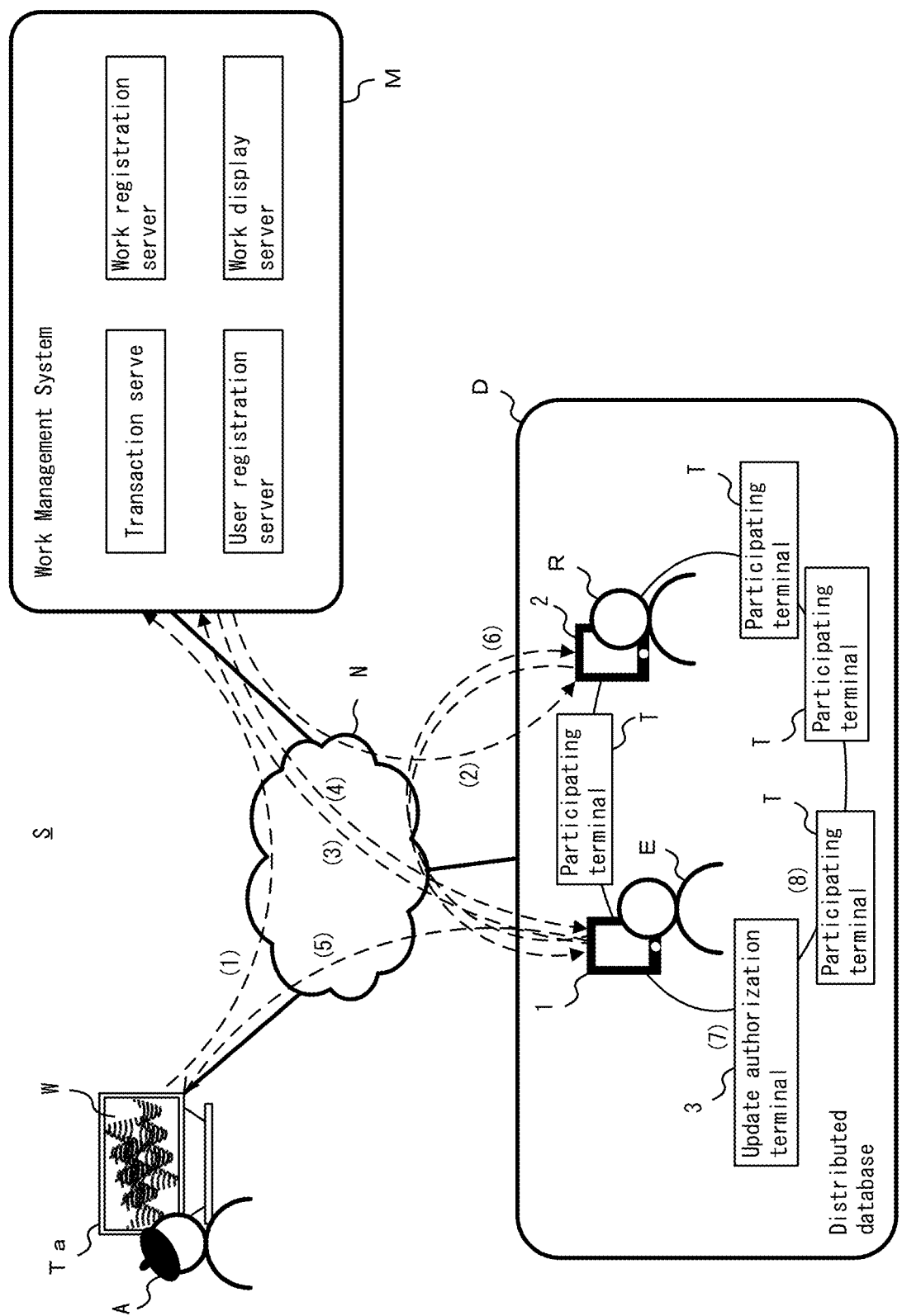
FIG. 1 illustrates an outline of a transaction management system according to the embodiment.

FIG. 1 illustrates an outline of a transaction management system S according to the embodiment. The transaction management system S according to the embodiment includes a creator terminal Ta, which is a terminal used by a creator A, a work management system M, which manages a work W, and a distributed database D which manages the distribution of the work W using a blockchain, and these are connected to each other in a communicable manner via a communication network N.

The communication network N can be realized using, for example, the Internet. The creator terminal Ta is a computer such as a known personal computer (PC), a tablet PC, a smart phone, a workstation, or the like. The work management system M functions as a registration server for registering the work W, a transaction server serving as a platform for transactions involving the work W, a user registration server for registering users participating in a blockchain for managing the distribution of the work W, and a work display server for displaying the work W. The work management system M may realize these functions by a single blade server, by using respective dedicated servers, or by cloud computing technology.

Hereinafter, by referring to FIG. 1, procedures of processing performed in the transaction management system S according to the embodiment will be described with reference to (1) to (8), and the description thereof corresponds to (1) to (8) in FIG. 1.

(1) The creator A registers the created work W in the work management system M. Specifically, the creator A registers at least creator information for specifying the creator A himself/herself and rule information for establishing transaction rules of the work W. Here, the creator information is a user identifier to be registered in the user registration server. By doing this, a blockchain for trading the work W in the work management system M is generated. It should be noted that FIG. 1 shows an example, in which the work W created by the creator A is digital art.

(2) The creator A sells the work W to others in the work management system M. FIG. 1 shows an example in which the creator A sells to a user R who is one of users participating in the distributed database D. Therefore, in FIG. 1, the current owner of the work W is the user R. In this case, a sales profit is attributed to the creator A. This is because it is the primary distribution in which the creator A himself/herself sells the work W which he/she owned to the user R.

(3) A user E, who is one of the users participating in the distributed database D, conducts a transaction with the user R concerning the transfer of ownership of the work W in the work management system M. Here, both the user E and the user R are users participating in the blockchain. Therefore, a terminal 1 used by the user E and a terminal 2 used by the user R are both one of a plurality of participating terminals T which are entitled to update the blockchain.

The user R is the current owner of the work W and is a user who transfers the ownership of the work W to the user E. On the other hand, the user E is a user who receives the ownership from the user R. Accordingly, in the following description, the user R and the user E may be referred to as an assignor R and an assignee E, respectively. Similarly, the terminal 1 and the terminal 2 may be referred to as an assignee terminal 1 and an assignor terminal 2, respectively.

(4) In the work management system M, the assignee E obtains an agreement concerning the transfer of ownership of the work W.

(5) An update authorization terminal 3 of the blockchain set to any one of the participating terminals T participating in the distributed database D sequentially executes the provisions established in the transaction rules on the basis of the rule information stored in the blockchain for trading the work W. Here, the blockchain used in the transaction management system S according to the embodiment is a blockchain that implements a contract function, for example, Ethereum. The update authorization terminal 3 is selected in accordance with a known rule such as Proof of Work (PoW).

A contract is a process executed at the time of a transaction, and is described using a predetermined programming language. In the transaction management system S according to the embodiment, the transaction rules include remitting a virtual currency, corresponding to an amount obtained by multiplying the transfer price of the work W by a predetermined ratio (beneficiary's profit rate), to a person (i.e., the creator A himself/herself) designated by the creator A. Therefore, the update authorization terminal 3 acquires the creator information for specifying the creator A from the blockchain, and remits, to the creator A, the virtual currency corresponding to a price obtained by multiplying the transfer price of the work W by the beneficiary's profit rate from the virtual currency of the assignee E.

(6) The update authorization terminal 3 remits, to the assignor R, a virtual currency corresponding to an amount obtained by subtracting a beneficiary's profit from the transfer price of the work W from the virtual currency of the assignee E. (7) The update authorization terminal 3 adds, to the blockchain, a transfer history indicating that the ownership of the work W has been transferred from the assignor R.

(8) The update authorization terminal 3 broadcasts a new blockchain to the distributed database D.

In this manner, the transaction management system S according to the embodiment can assure the resale right of the creator A for the work W by using the contract function provided in the blockchain. This ensures that even if the work W is resold in a secondary distribution market after the work W has left the creator A's hands, the creator A can earn a certain profit each time a transaction takes place.

<Functional configuration of the update authorization terminal 3 according to the embodiment>

Figure 2:
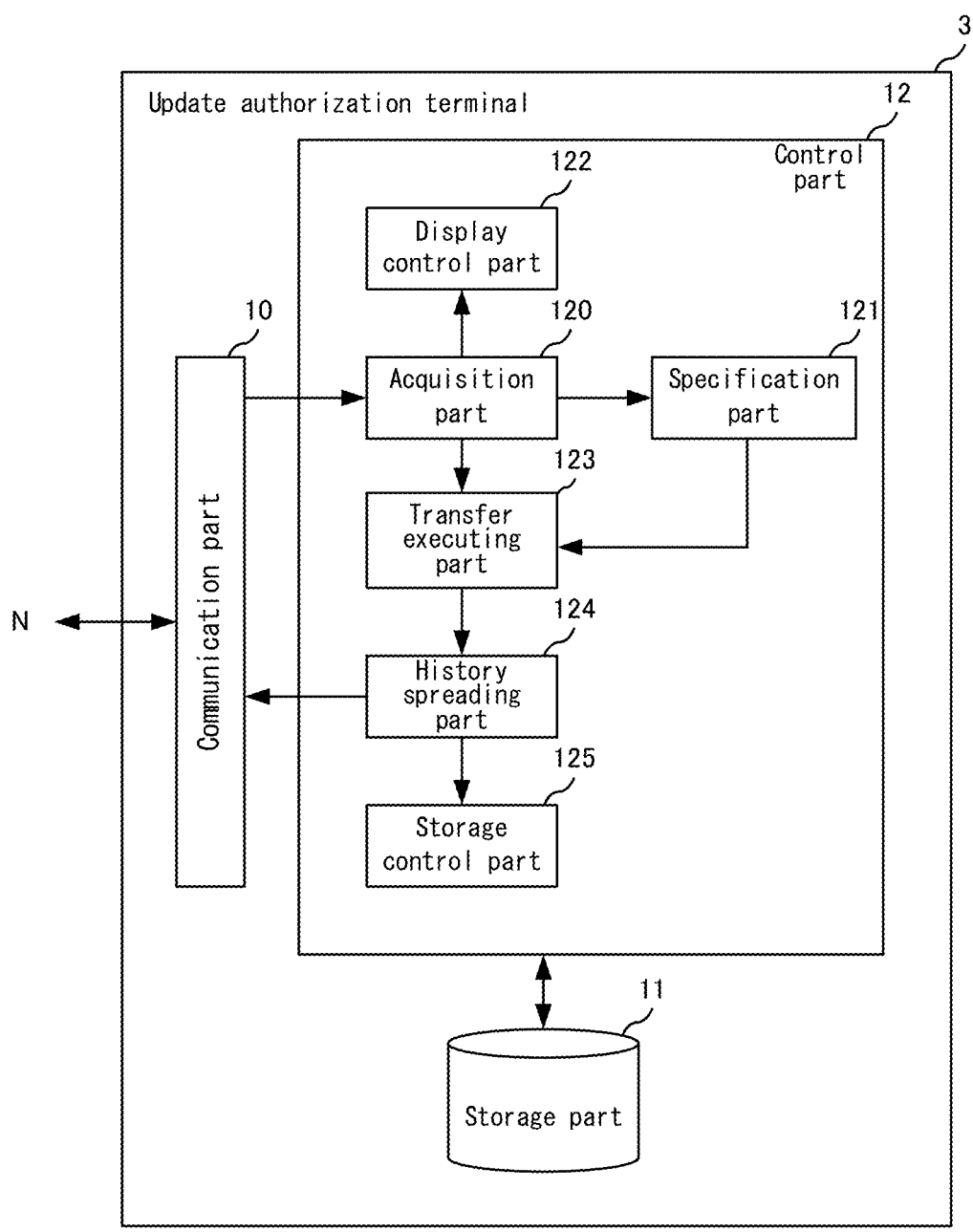
FIG. 2 is a schematic diagram showing a functional configuration of an assignee terminal according to the embodiment.

Next, a functional configuration of the update authorization terminal 3 according to the embodiment will be described. FIG. 2 is a schematic diagram showing the functional configuration of the update authorization terminal 3 according to the embodiment. The update authorization terminal 3 according to the embodiment includes a communication part 10, a storage part 11, and a control part 12. It should be noted that any of the participating terminals T participating in the distributed database D may be the update authorization terminal 3.

The communication part 10 transmits and receives data to and from the assignee terminal 1, the assignor terminal 2, the creator terminal Ta, and a work managing system M via the communication network N. The storage part 11 is a mass-storage device such as a hard disk drive (HDD) or a solid state drive (SSD) that stores (i) a read only memory (ROM) which stores a basic input output system (BIOS) for a computer, and the like that realize the update authorization terminal 3, (ii) a random access memory (RAM) which is a work area of the update authorization terminal 3, (iii) an operating system (OS) and application programs, and (iv) various types of information including a blockchain to be referenced when executing the application programs.

The control part 12 includes a processor such as a central processing unit (CPU) or a graphics processing unit (GPU) of the update authorization terminal 3, and functions as an acquisition part 120, a specification part 121, a display control part 122, a transfer executing part 123, a history spreading part 124, and a storage control part 125 by executing programs stored in the storage part 11.

The acquisition part 120 acquires the blockchain for trading the work W (hereinafter, simply referred to as the "blockchain"). This blockchain is built on the communication network N. Specifically, the blockchain acquired by the acquisition part 120 is a blockchain in which a plurality of blocks are linked, and the blocks store (i) the creator information for identifying the creator A of the work W, (ii) the rule information for establishing the transaction rules of the work W, (iii) information about the virtual currency used for the transactions of the work W, (iv) information associated with the work W, and (v) a transfer history of the work W.

The specification part 121 specifies the current owner of the work W from the transfer history included in the blockchain acquired by acquisition part 120. Specifically, the specification part 121 specifies the current owner of the work W by specifying the latest assignee from the transfer history included in the blockchain. The specification part 121 also specifies an assignee who wishes for a transfer of the work W from the current owner.

The display control part 122 displays the information associated with the work W included in the blockchain acquired by acquisition part 120 on a display part of the assignee terminal 1. Here, the "information associated with the work W" is information prepared as a reference to be referenced by the assignee E and the assignor R at the time of the transaction of the work W. Specific examples of the information associated with the work W include an image of the work W, an image of the creator A of the work W, and text data and moving image data relating to the work W. When audio data is included in the information associated with the work W, an audio output part (not shown) of the assignee terminal 1 may output the audio data.

This reference information is stored in the work display server, which is a part of the work management system M, and the reference information or a storage destination of the reference information is stored in the blockchain. The display control part 122 acquires information from the work display server on the basis of the reference information and displays the information on the display part of the assignee terminal 1. Because the assignee E can confirm the information about the work W at the time of the transaction of the work W, mixing up of transaction targets can be prevented.

The transfer executing part 123 executes processing for transferring the ownership of the work W from the assignor R, who is the current owner, to the assignee E in accordance with the transaction rules included in the blockchain. Here, the "transaction rules" is a procedure which is required to be executed whenever the work W is transferred. In the transaction management system S according to the embodiment, it is configured that any transaction that does not conform to the transaction rules is invalidated such that the ownership of the work W is not transferred. Details of processing executed by the transfer executing part 123 will be described below.

The history spreading part 124 broadcasts, via the communication network N, to a plurality of the participating terminals T (i.e., the participating terminals T participating in the distributed database D) participating in the update of the blockchain in which the transfer history of the ownership of the work W is added. By doing this, the update authorization terminal 3 can share the latest blockchain between the participating terminals T participating in the distributed database D.

The storage control part 125 stores the updated blockchain including the transfer history to the storage part 11. By doing this, the transfer of the ownership of the work W from the assignee E to the assignor R is shared in the distributed database D, and the transfer of the ownership of the work W is established.

It should be noted that if the work W is digital art composed of digital data, the blockchain may store a hash value of the work W. The hash value of the work W is generated using known hash functions such as a secure hash algorithm 3 (SHA-3) and the like.

The transfer executing part 123 may transfer the ownership of the work W to the assignee E on the condition that the hash value of the work W owned by the current owner matches the hash value stored in the blockchain. That is, on the condition that the hash value of the work W owned by the current owner matches the hash value stored in the blockchain is included in the transaction rules. This ensures that assignee E receives the original work W that has not been altered.

Figure 3:
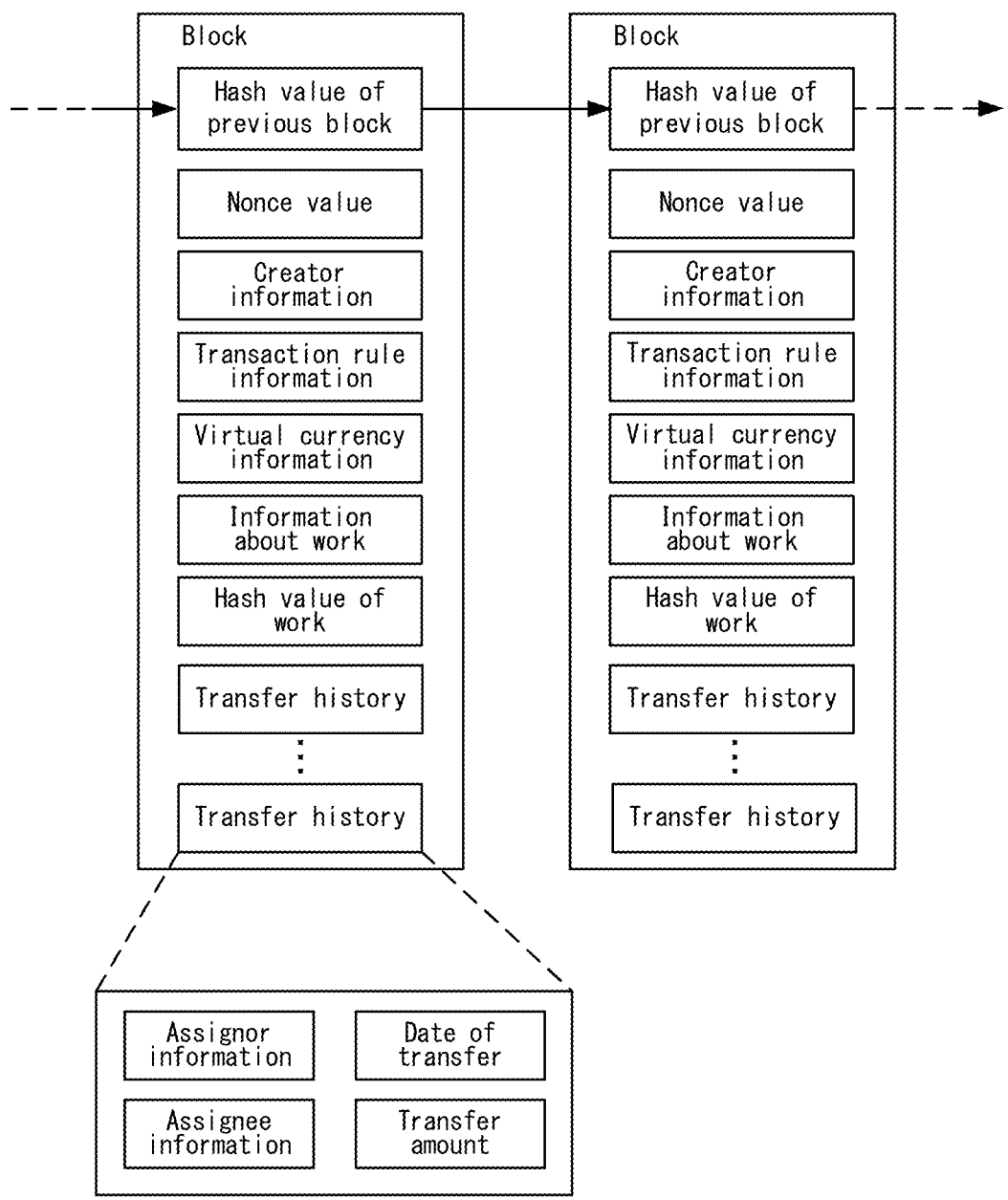
FIG. 3 is a schematic diagram showing a configuration of a blockchain shared by a distributed database according to the embodiment.

FIG. 3 a schematic diagram showing a configuration of the blockchain shared by the distributed database D according to the embodiment. As shown in FIG. 3, the blockchain is information of linked blocks. Each of the blocks includes a hash value of information indicating an immediately previous block, a nonce value, the creator information, the transaction rule information, the virtual currency information, the information about the work W, the hash value of the work W, and a transaction history of the work W. The nonce value is information used to make the hash value of a block satisfy a specific condition.

The transfer history includes (i) assignor information for identifying the assignor R of the work W, (ii) assignee information for identifying the assignee E of the work W, (iii) date of transfer for indicating the date and time when the transaction of the work W took place, and (iv) transfer amount for indicating a transaction amount of the work W. Among the blockchains shown in FIG. 3, the pieces of information excluding the transfer history are determined when the blockchains are generated, i.e., when the creator A registered the work W in the work management system M, and thereafter, no one except the creator A himself/herself can change these pieces of information. The transaction management system S according to the embodiment can assure an execution of the resale right of the creator A by providing a beneficiary's profit remittance clause for the creator A of the work W in the rule information stored in the blockchain.

<Transaction Processing Executed by the Transfer Executing Part 123>

Figure 4:
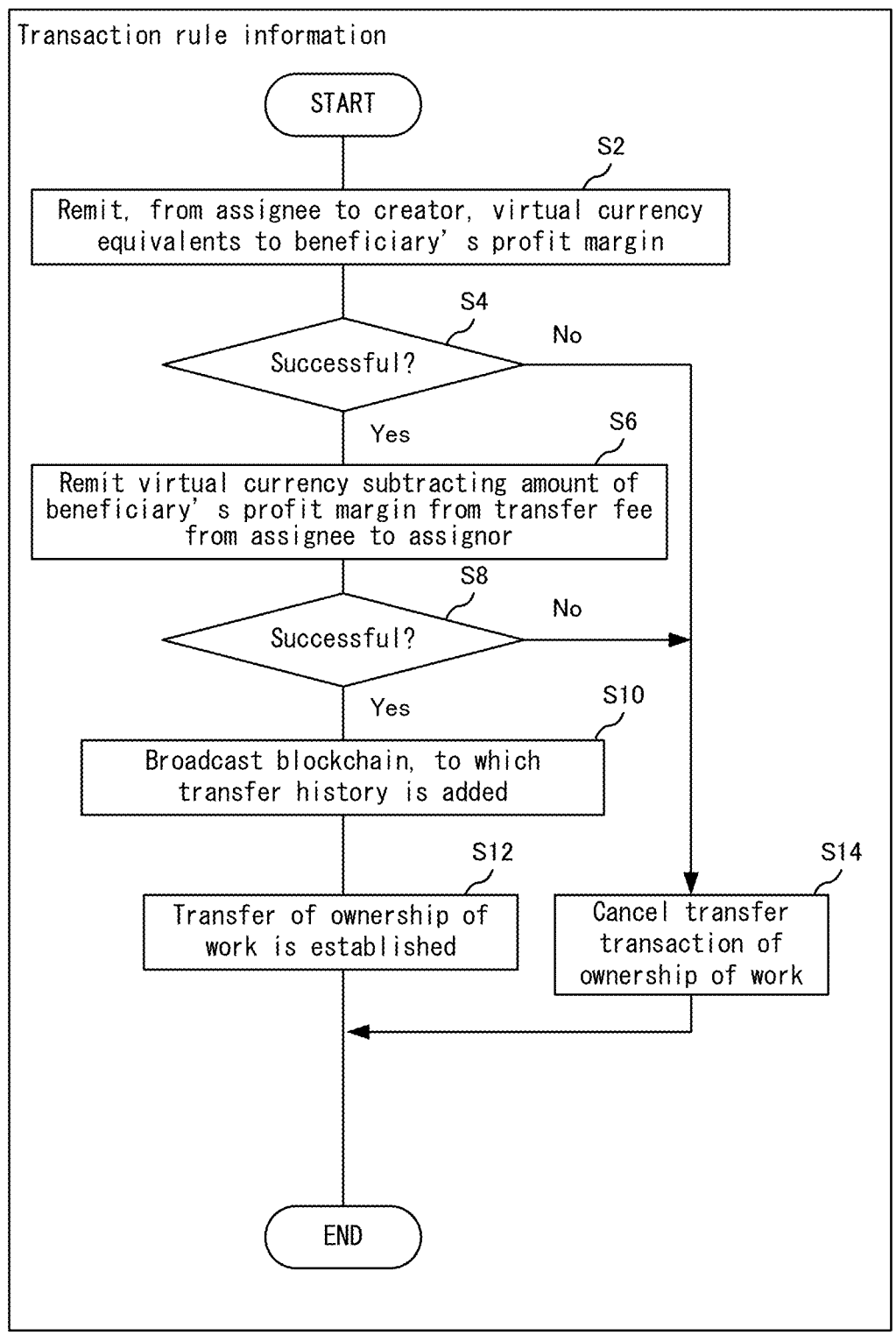
FIG. 4 illustrates transaction rule information stored in the blockchain according to the embodiment.

Next, transaction processing executed by the transfer executing part 123 at the time of transaction of the work W will be described. FIG. 4 illustrates transaction rule information stored in the blockchain according to the embodiment. As described above, the contract function is implemented in the blockchain used by the transaction management system S according to the embodiment. The actual state of the contract function is a function or procedure implemented using a predetermined programming language, and any process can be described within a range in which the programming language can expressed. Therefore, as shown in FIG. 4, the transaction rule information can be represented in the form of a flowchart.

The transaction management system S according to the embodiment implements at least the following three contracts in order to assure the execution of the resale right of the creator A of the work W: 1. Remitting, from the assignee E to the creator A, a virtual currency amount equivalent to the beneficiary's profit margin; 2. Remitting, from the assignee E to the assignor R, a virtual currency amount obtained by subtracting the beneficiary's profit margin from the selling price; and 3. Updating (broadcasting the blockchain to the distributed database D) the transfer history including the virtual currency amount at the latest selling price.

The flowchart shown in FIG. 4 starts when the assignor R agrees to a transaction to transfer the ownership of the work W to the assignee E. The transfer executing part 123 remits, to the creator A, the virtual currency of the assignee E, which corresponds to an amount obtained by multiplying the transfer price of the work W by the beneficiary's profit rate (step S2). The beneficiary's profit rate is stored in the rule information in advance.

When the remittance to the creator A is successful (Yes in step S4), the transfer executing part 123 remits, to the assignor R, the virtual currency of the assignee E, which corresponds to an amount obtained by subtracting an amount of the beneficiary's profit margin from the transfer price of the work W (step S6). If the remittance to the assignor R is successful (Yes in step S8), the blockchain to which has been added the transfer history between the assignee E and the assignor R, including the transfer price, is broadcasted to the distributed database D (step S10). By doing this, the transfer of the ownership of the work W from the assignor R to the assignee E is established (step S12).

When the remittance from the assignee E to the creator A fails (No in step S4) or when the remittance from the assignee E to the assignor R fails (No in step S8), the transfer executing part 123 cancels the transfer transaction of the ownership of the work W with the assignor R (step S14). In this case, the virtual currency already remitted from the assignee E to the creator A or the assignor R is returned to the assignee E. Also, the ownership of the work W remains with the assignor R.

When the transfer of the ownership of the work W from the assignor R to the assignee E is established or when the transfer transaction of the ownership of the work W with the assignor R ends in failure, processing of this flowchart ends.

In this manner, the transfer executing part 123 adds an amount that the creator receives, which is the amount obtained by multiplying the transfer price of the work W by the beneficiary's profit rate, which is the ratio established in the transaction rules, to the balance of the virtual currency associated with the creator A of the work W in accordance with the transaction rule information stored in the blockchain. At the same time, the transfer executing part 123 subtracts the virtual currency corresponding to the creator's receiving amount from the balance of the virtual currency associated with the assignee E. The contracts stored in the blockchain enable the transaction management system S to assure the execution of the resale right of the creator A by requiring the remittance from the assignee E to the creator A at the time of the transaction of the work W.

For example, when the virtual currency associated with the creator A of the work W cannot be specified, the transfer executing part 123 cannot make a remittance from the assignee E to the creator A. Further, for example, when the balance of the virtual currency associated with the assignee E is less than the transfer price of the work W or the virtual currency associated with the assignor R who is the current owner of the work W cannot be specified, the transfer executing part 123 cannot make a remittance from the assignee E to the assignor R. In such cases, the transfer executing part 123 stops the transaction of receiving the ownership of the work W from the assignor R. As a result, the transfer executing part 123 prevents the beneficiary's profit from being provided to the creator A based on the invalid transaction.

<Flow of Transaction Processing Executed by the Transaction Management System S According to the Embodiment>

Figure 5:
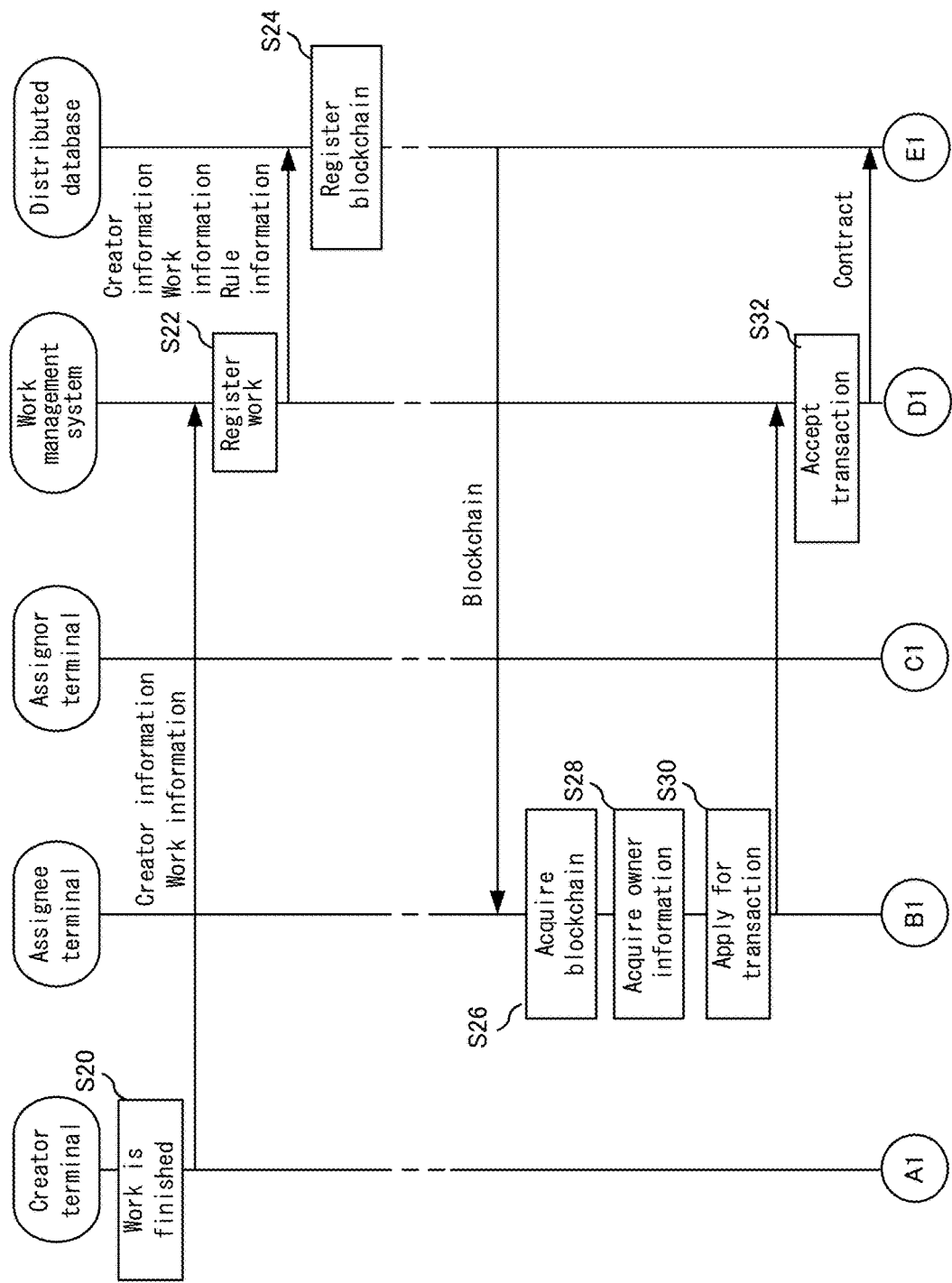
FIG. 5 illustrates the first half of a sequence diagram for explaining transaction processing executed in the transaction management system according to the embodiment.
Figure 6:
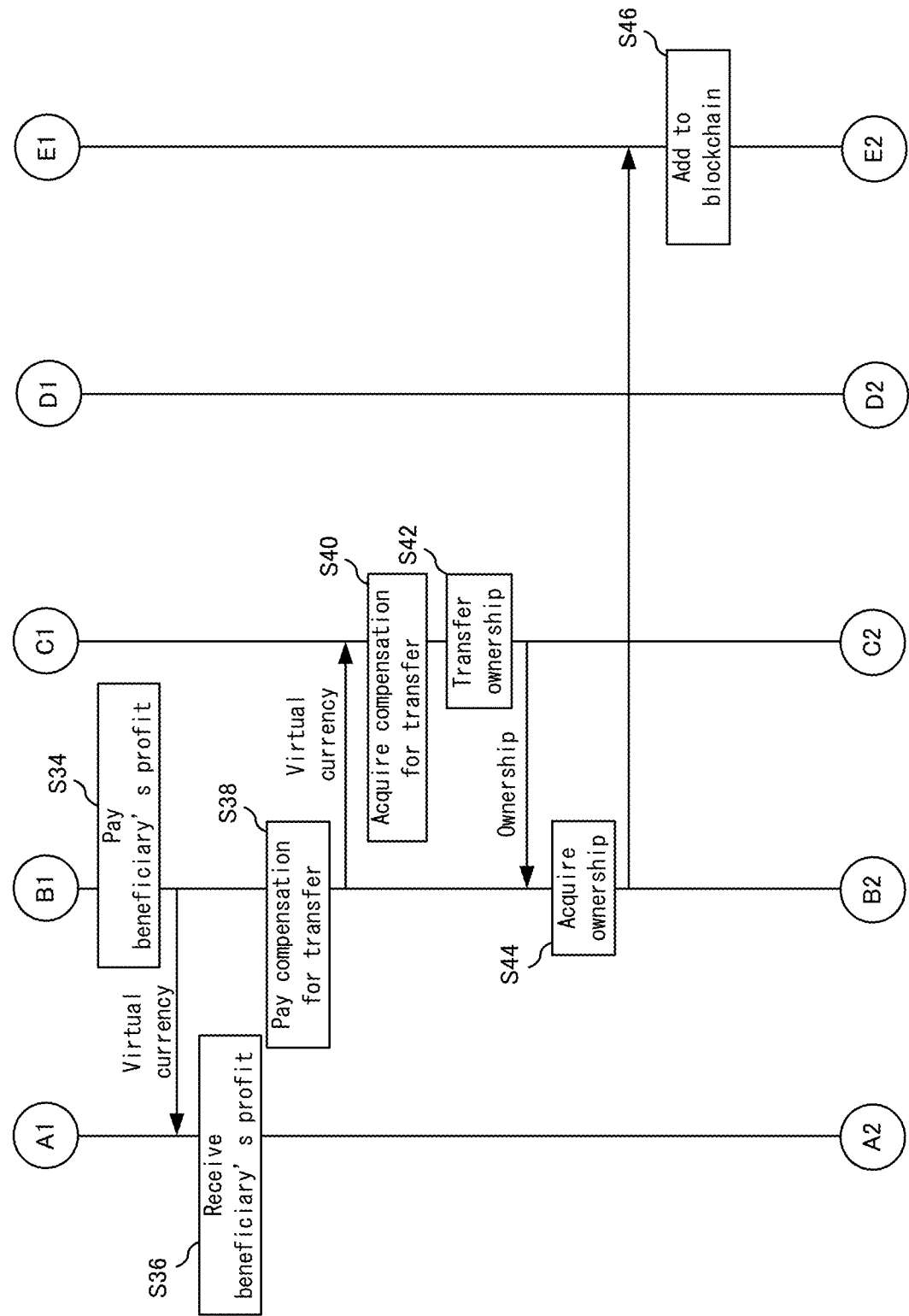
FIG. 6 illustrates a middle phase of the sequence diagram for explaining transaction processing executed in the transaction management system according to the embodiment.
Figure 7:
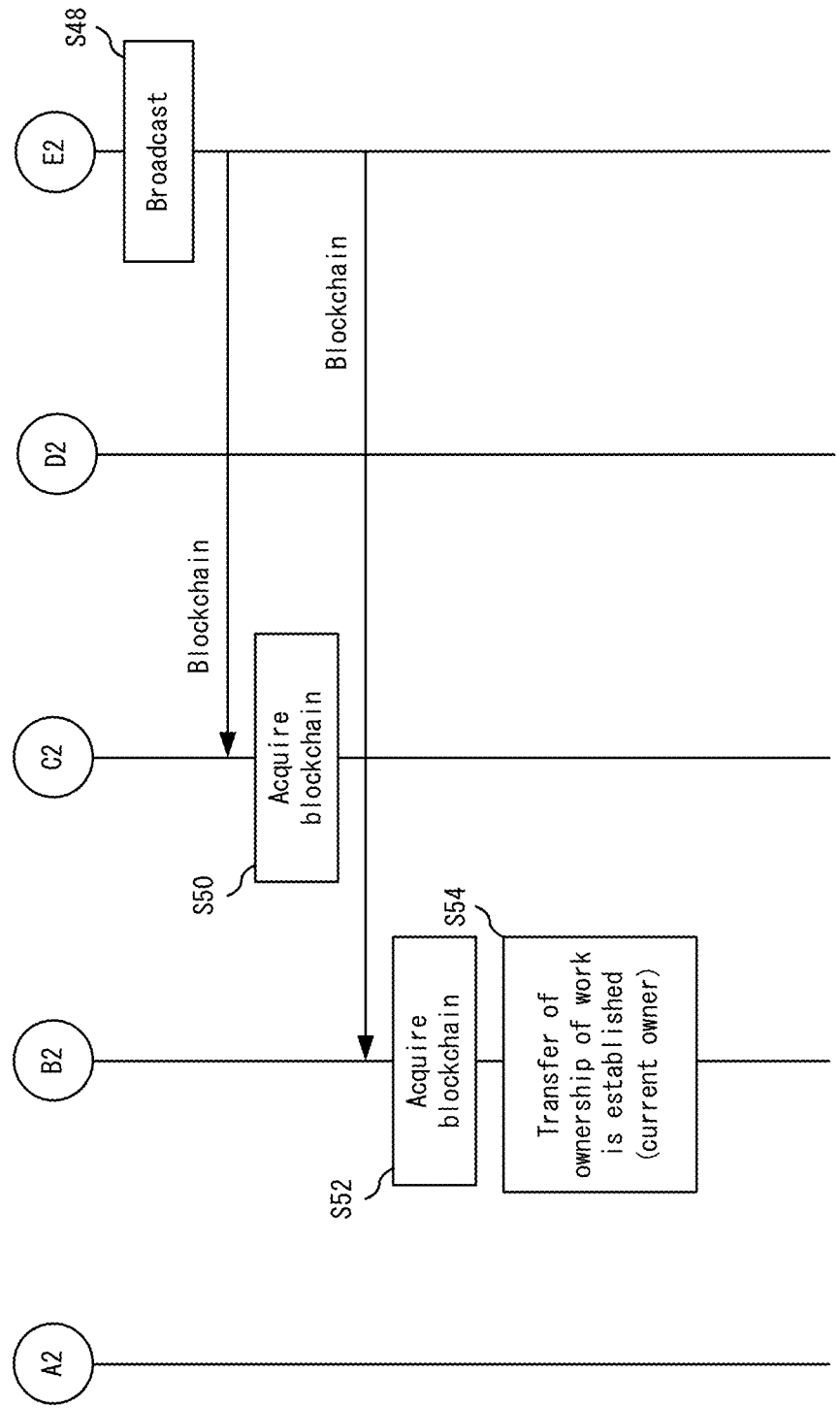
FIG. 7 illustrates the second half of the sequence diagram for explaining transaction processing executed in the transaction management system according to the embodiment.

Referring to FIGS. 5, 6, and 7, a flow of transaction processing executed by the transaction management system S according to the embodiment will be described below.

FIG. 5 illustrates the first half of a sequence diagram for explaining transaction processing executed in the transaction management system S according to the embodiment. When the work W is finished (step S20), the creator A transmits the creator information and the work information to the work management system M. The work management system M registers the work W on the basis of the information received from the creator A (step S22).

In the work management system M, the rule information is added to the creator information and the work information to generate a blockchain for trading the work W, and the blockchain is registered in the distributed database D (step S24). Thereafter, as the primary distribution, the ownership of the work W is transferred to others. In FIGS. 5, 6 and 7, the current owner of the work W is the assignor R.

The assignee E, who wishes for a transfer of the ownership of the work W, acquires the latest blockchain from the distributed database D using the assignee terminal 1 (step S26). Here, the latest blockchain is the most trusted blockchain and is, for example, the blockchain having the longest chain length. By analyzing the transfer history included in the acquired blockchain, the assignee terminal 1 acquires the owner information which specifies the assignor R, who is the latest owner of the work W (step S28).

Using the assignee terminal 1, the assignee E applies to the work management system M for a transfer transaction of the work W (step S30). When the work management system M accepts the transaction from the assignee terminal 1 (step S32), the work management system M broadcasts the contracts for realizing the rule information to the distributed database D.

FIG. 6 illustrates a middle phase of the sequence diagram for explaining transaction processing executed in the transaction management system S according to the embodiment, and shows the continuation of the sequence diagram shown in FIG. 5.

In accordance with the contracts, the update authorization terminal 3 in the distributed database D converts an amount corresponding to the amount obtained by multiplying the transfer price of the work W by the beneficiary's profit rate into the virtual currency, as the beneficiary's profit, and makes the assignee E pay that amount to the creator A (step S34). As a result, the creator A can receive the beneficiary's profit in the secondary distribution of the work W (step S36).

The update authorization terminal 3 converts an amount obtained by subtracting the beneficiary's profit from the transfer price of the work W into the virtual currency, as compensation for the transfer of the work W, and makes the assignee E pay this amount to the assignor R (step S38). By doing this, the assignor R can acquire the compensation for the transfer of the work W from the assignee E (step S40). The update authorization terminal 3 transfers the ownership of the work W from the assignor R to the assignee E in exchange for the assignor R receiving the compensation for the transfer of the work W from the assignee E (step S42). By doing this, the assignee E can acquire the ownership of the work W from the assignor R (step S44).

The update authorization terminal 3 adds, to the blockchain, the transfer history indicating that the ownership of the work W has been transferred from the assignor R to the assignee E (step S46).

FIG. 7 illustrates the second half of the sequence diagram for explaining transaction processing executed in the transaction management system S according to the embodiment, and shows the continuation of the sequence shown in FIG. 6.

The update authorization terminal 3 broadcasts the blockchain to which the transfer history has been added, to the distributed database D (step S48). Since the blockchain is added and updated as a new blockchain in the distributed database D, the assignor terminal 2 used by the assignor R acquires the new blockchain (step S50). Similarly, the assignee terminal 1 used by the assignee E acquires the new blockchain (step S52).

In this manner, the new blockchain is shared in the distributed database D, and the transfer of the ownership of the work W from the assignor R to the assignee E is established (step S54). As a result, the current owner of the work W becomes the assignee E.

<Effects of the Transaction Management System S according to the Embodiment>

As described above, the transaction management system S according to the embodiment can manage the secondary distribution of the work W. In particular, in the transaction management system S according to the embodiment, remitting a part of the transfer price to the creator A of the work W is a condition for the transfer transaction of the work W. As a result, the execution of the resale right of the creator A for the work W can be assured.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments. Such variation examples will be described below. <Variation Example 1>

Cases where the assignee terminal 1 pays the beneficiary's profit to the creator A according to the contracts were mainly explained above. Here, the payment destination of the beneficiary's profit, which the assignee terminal 1 pays, may be changed by the creator A.

In order to realize this, in a transaction management system S according to Variation Example 1, a contract of the blockchain for managing the distribution of the work W are provided with a provision for changing a payment destination of the beneficiary's profit. Specifically, the contract of the blockchain used by the transaction management system S according to Variation Example 1 stipulate that "the virtual currency amount corresponding to the beneficiary's profit margin should be transferred from the assignee E to the person designated by the creator A."

In the transaction management system S according to Variation Example 1, only the creator A may change the payment destination of the beneficiary's profit. That is, the work management system M permits a change in the payment destination of the beneficiary's profit in the contracts of the blockchain for managing the distribution of the work W, on the condition that the work management system M is logged into with the creator A's user identifier and the corresponding password or secret key.

The work management system M broadcasts to the distributed database D that there has been the change in the payment destination of the beneficiary's profit in the contracts. Alternatively, only the update authorization terminal 3 possessed by the creator A may be allowed to broadcast to the distributed database D that there has been the change in the payment destination of the beneficiary's profit in the contract. Any of the update authorization terminals of the participating terminals T participating in the distributed database D adds a blockchain including the broadcasted transfer history. By doing this, the change in the payment destination of the beneficiary's profit in the contract is established. Thereafter, when the assignee terminal 1 executes the contract at the time of transaction of the work W, the virtual currency amount corresponding to the beneficiary's profit margin is remitted from the assignee E to a person or management organization designated by the creator A.

In this manner, the creator A of the work W can change a payment destination of the beneficiary's profit. For this reason, the creator A can delegate, for example, management of the beneficiary's profit to heirs, guardians, management organizations such as trust banks, or the like while the creator A is alive. Consequently, since the creator A can entrust others with complicated procedures and the like that occur in connection with the receipt of the beneficiary's profit, the creator A can concentrate on creative activities.

<Variation Example 2>

Cases where the beneficiary's profit is paid to the creator A using the virtual currency were explained above. Here, the payment of the beneficiary's profit is not limited to the virtual currency. For example, the update authorization terminal 3 may use the contract function of the blockchain to remit cash equivalent to the beneficiary's profit from the assignee E's account to the creator A's account.

<Variation Example 3 >

Cases where the beneficiary's profit is paid from the assignee E to the creator A using the contract function of the blockchain were explained above, but the contract function does not need to include a payment function. Here, as described above, the blockchain can also be regarded as one distributed database technique in which a gigantic ledger recording the history of all transactions of participants is shared by all participants. The creator A can check the transaction history of his/her work W at any time. Therefore, if payment of the beneficiary's profit from the assignee E to the creator A is not implemented in the contract function of the blockchain, the creator A may use the ledger as a basis for the resale right.

<Variation Example 4>

Cases where the transaction management system S according to the embodiment manages the ownership of the work W were mainly explained above. Alternatively or additionally, a transaction management system S according to Variation Example 4 may manage an exploitation right established for the work W. The transaction management system S according to Variation Example 4 will be described below. It should be noted that the work W mainly handled by the transaction management system S according to Variation Example 4 is assumed to be, for example, a work such as characters that can be used for various goods and services, but the work W may be a painting, a sculpture, etc., that is created as a single piece of work.

Figure 8:
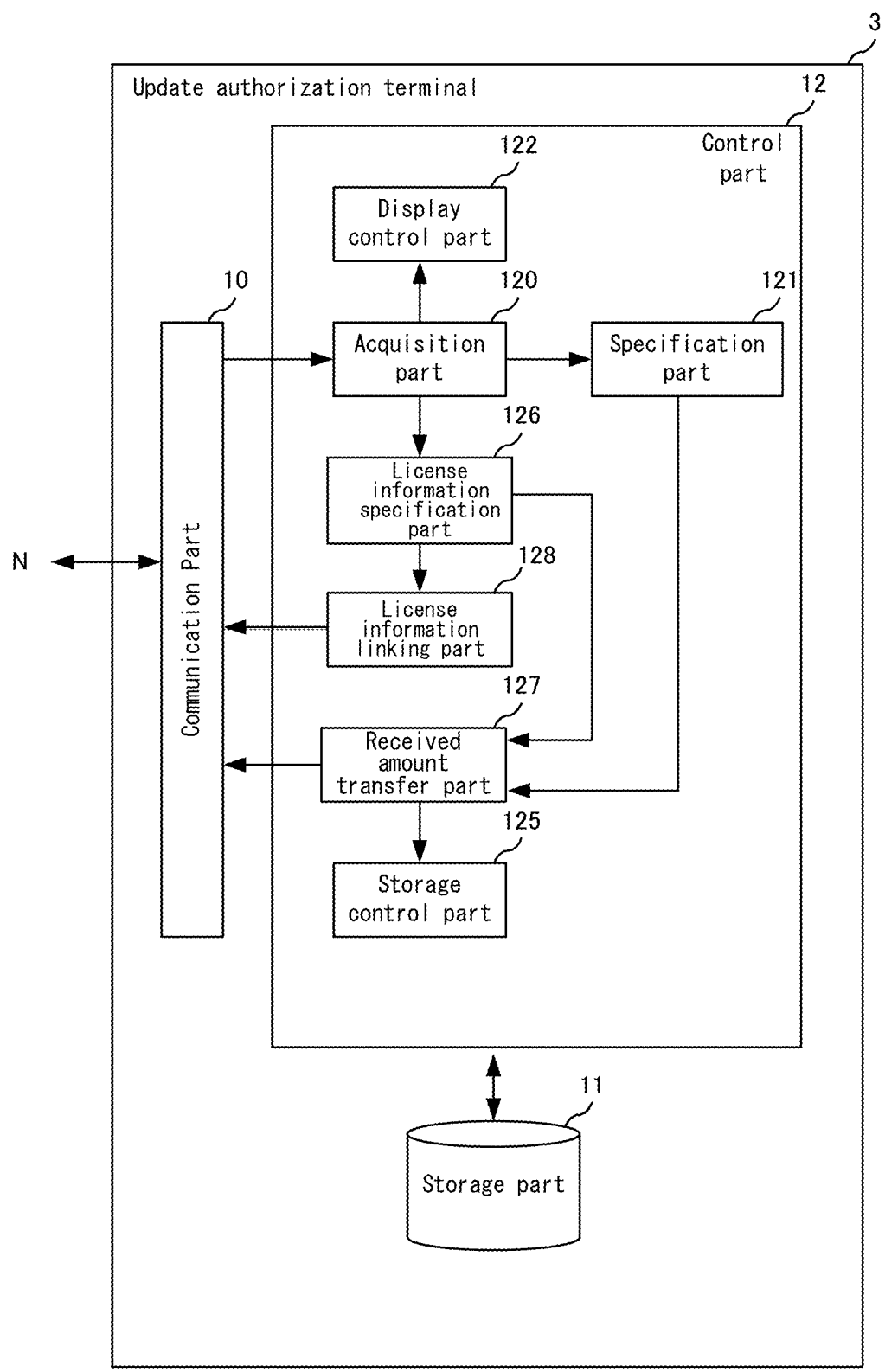
FIG. 8 is a schematic diagram showing a functional configuration of the assignee terminal according to Variation Example 4.

FIG. 8 is a schematic diagram showing a functional configuration of the update authorization terminal 3 according to Variation Example 4. The update authorization terminal 3 according to Variation Example 4 includes the communication part 10, the storage part 11, and the control part 12. The control part 12 includes the acquisition part 120, the specification part 121, the display control part 122, the storage control part 125, a license information specification part 126, a received amount transfer part 127, and a license information linking part 128.

It should be noted that FIG. 8 shows only the functional configuration of the update authorization terminal 3 according to Variation Example 4, and other configurations are omitted. For example, the update authorization terminal 3 according to Variation Example 4 may include the transfer executing part 123 and the history spreading part 124 in a similar manner as with the update authorization terminal 3 according to the embodiment.

The acquisition part 120 acquires the blockchain. The blockchain acquired by the acquisition part 120 according to Variation Example 4 is a blockchain, in which a plurality of blocks are linked, and the blocks store (i) the creator information for identifying the creator A of the work W, (ii) the rule information for establishing the transaction rules of the work W, (iii) the information about the virtual currency used for the transactions of the work W, and (iv) information relating to the transfer history of the work W and the exploitation right established for the work W. In particular, unlike the blockchain according to the embodiment, the blockchain acquired by acquisition part 120 according to Variation Example 4 also links a plurality of blocks that store information relating to the exploitation right established for the work W.

Here, the "exploitation right of the work W" is a generic term for a right that allows others, other than the owner of the work W, to use the work W while reserving the ownership of the work W to the owner of the work W (not necessarily the author of the work W). Examples of exploitation rights include: right of reproduction, right to transmit to the public, translation rights, adaptation rights, right of on-screen presentation, stage performance rights, musical performance rights, recitation rights, exhibition rights, distribution rights, right to rent out, etc. For example, when the work W is a comic book, the "exploitation right of the work W" is a right to use characters from the comic book on writing instruments such as a notebook, a pencil, etc., and to create and use mascot costumes for a dance performance on a stage.

The license information specification part 126 specifies information relating to exploitation right included in the blockchain acquired by acquisition part 120.

Figure 9:
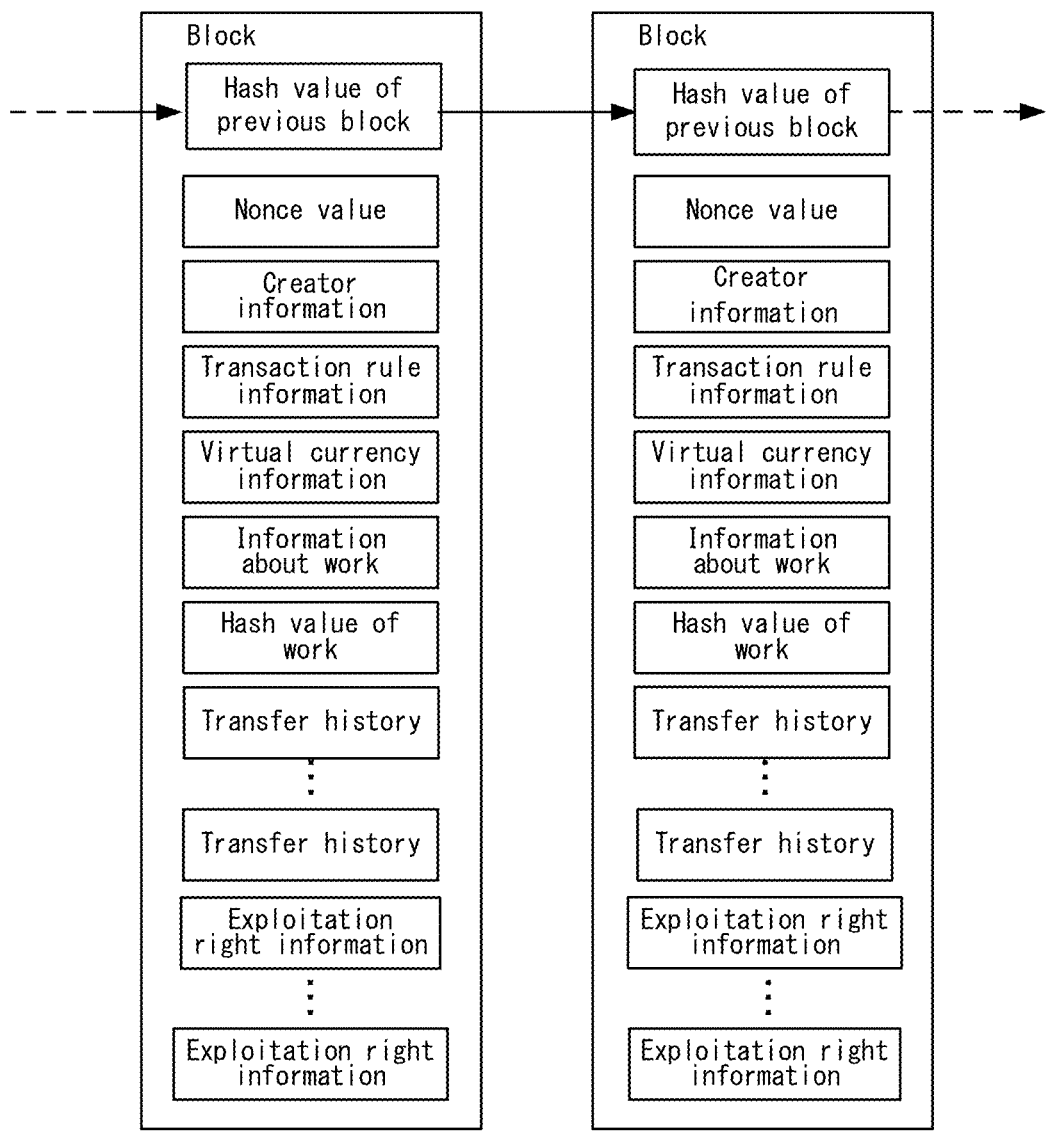
FIG. 9 is a schematic diagram showing a configuration of the blockchain shared by the distributed database according to Variation Example 4.

FIG. 9 is a schematic diagram showing a configuration of the blockchain shared by the distributed database D according to Variation Example 4. The blockchain shared by the distributed database D according to Variation Example 4 is information obtained by linking a plurality of blocks, in the same manner as with the blockchain shared by the distributed database D according to the embodiment. In the blockchain according to Variation Example 4, each of the plurality of blocks includes a hash value of information indicating the immediately previous block, a nonce value, creator information, transaction rule information, virtual currency information, information about the work W, a hash value of the work W, the transaction history of the work W, and information relating to the exploitation right established for the work W.

Figure 10:
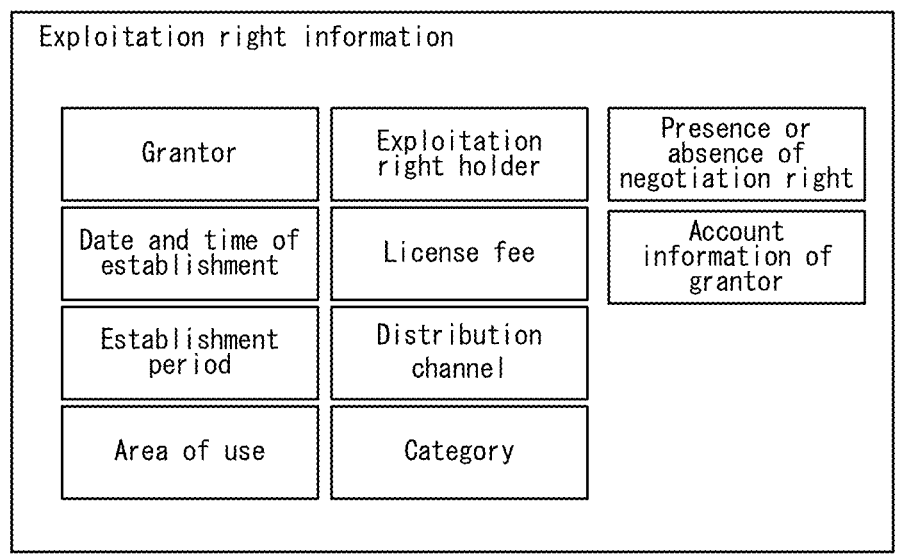
FIG. 10 is a diagram showing examples of various types of information included in information relating to an exploitation right according to Variation Example 4.

FIG. 10 is a diagram showing examples of various types of information included in the information relating to the exploitation right according to Variation Example 4. As shown in FIG. 10, the information relating to the exploitation right established for the work W (hereinafter referred to as "exploitation right information") includes the following: information of a grantor who granted the exploitation right, information of an exploitation right holder for which the exploitation right has been established, the date and time of establishment of the exploitation right, an establishment period of the exploitation right, an area of use of the exploitation right, a distribution channel of the exploitation right, a form of use of the exploitation right, a license fee of the exploitation right, and account information of the grantor.

Here, the "area of use of the exploitation right" is information for specifying geographical restrictions in which the work W can be used. Specifically, the exploitation right holder of the work W may use the work W only in an area defined as the area of use of the exploitation right, and the exploitation right holder of the work W is not permitted to use the work W elsewhere.

The "distribution channel of the exploitation right" is information for specifying restrictions on channels for distributing goods in which the work W is used. Specifically, it is information indicating a department store, a mass sales market, a new product retailer, a catalog of a mail order, the Internet, and the like.

The "form of use of the exploitation right" is information for specifying restrictions on intended end-usage of the work W. Specifically, it is information indicating categories of goods or services in which the work W is used, such as socks, T-shirts, shoes, stationery, performance on a stage, and the like.

The license information linking part 128 links information relating to a new exploitation right to the blockchain acquired by acquisition part 120. Here, if all of the establishment period of the exploitation right, the area of use of the exploitation right, the distribution channel of the exploitation right, and the form of use of the exploitation right included in the information relating to the exploitation right to be newly linked overlap with all of the establishment period of the exploitation right, the area of use of the exploitation right, the distribution channel of the exploitation right, and the form of use of the exploitation right included in any piece of the information relating to the exploitation right already linked to the blockchain acquired by acquisition part 120, the license information linking part 128 stops the linking of the information relating to the new exploitation right.

As a result, the transaction management system S according to Variation Example 4 can prevent an establishment of different exploitation rights in which the date and time of the exploitation right, the establishment period of the exploitation right, the area of use of the exploitation right, the distribution channel of the exploitation right, and the form of use of the exploitation right overlap.

The license information specification part 126 analyzes the exploitation right information included in the blockchain, thereby acquiring a license fee of an exploitation right which is valid at the time of analysis among exploitation rights established for the work W.

In the transaction management system S according to Variation Example 4, the rule information establishing the transaction rules of the work W includes rule information relating to the establishment of the exploitation right of the work W. Specifically, a contract of the blockchain used by the transaction management system S according to Variation Example 4 stipulates that "when the exploitation right of the work W is established, a virtual currency amount corresponding to the creator's receiving amount from the grantor shall be remitted to a person or management organization designated by the creator A," and "the creator's receiving amount shall be an amount obtained by multiplying the license fee of the exploitation right of the work W by the beneficiary's profit rate."

In accordance with the transaction rules established in the rule information, the received amount transfer part 127 subtracts the creator's receiving amount, which is the amount obtained by multiplying the license fee by the beneficiary's profit rate established in the transaction rules, from the balance of the virtual currency associated with the grantor, and adds the creator's receiving amount to the balance of the virtual currency associated with the person or management organization designated by the creator of the work W.

It should be noted that when the current owner of the work W grants the exploitation right of the work W to another person, the grantor in such a case is the current owner. In addition, when the person who has been granted the exploitation right of the work W further grants the exploitation right of the work W to others, the grantor in such a case is a person different from the current owner of the work W. In any case, the received amount transfer part 127 subtracts the creator's receiving amount from the balance of the virtual currency associated with the grantor, and adds the creator's receiving amount to the balance of the virtual currency associated with the person or management organization designated by the creator of the work W.

As described above, the transaction management system S according to Variation Example 4 can realize, as one aspect of the resale right of the creator A relating to the exploitation right of the work W, returning a part of the profit relating to the license fee of the exploitation right to the creator A by using the contract function provided in the blockchain. This ensures that even if an exploitation right is granted for the work W after the work W has left the creator A's hands, the creator A will obtain a part of the profits gained by the exploitation right granted by the owner of the work W.

In the update authorization terminal 3 according to Variation Example 4, the received amount transfer part 127 of the update authorization terminal 3 owned by the creator A of the work W accepts a designation of the person or management organization which receives the payment of the creator's receiving amount. The received amount transfer part 127 changes a remittee established in a beneficiary's profit remittance clause, which is included in the rule information, and establishes a remittance of the creator's receiving amount to the person or management organization which receives the payment of the creator's receiving amount and is designated by the creator A, and then broadcasts the changed remittee to the distributed database D. Any of update authorization terminals of the participating terminals T participating in the distributed database D adds the blockchain including the broadcasted transfer history. By doing this, the change in the payment destination of the beneficiary's profit in the contract is established. Thereafter, when the exploitation right is established for the work W, the contract is executed at the time of establishment, and the virtual currency amount corresponding to the beneficiary's profit margin is remitted from the grantor to the person or management organization designated by the creator A.

For example, the creator A can delegate the management of the beneficiary's profits to heirs, guardians, management organizations such as trust banks, or the like while the creator A is alive. As a result, the creator A of the work W can entrust others with complicated procedures and the like that occur in connection with the receipt of the beneficiary's profit, and so the creator A can concentrate on creative activities. Furthermore, even after the death of the creator A of the work W, since the beneficiary's profit can be received by the person or management organization designated by the creator A, exercise of the resale right can be ensured more reliably.

In the transaction management system S according to Variation Example 4, in a similar manner as with the transaction management system S according to the embodiment, the work W created by the creator A may be a digital art. If the work W is the digital art, the blockchain stores a hash value of the work W.

The specification part 121 analyzes the transfer history to identify the current owner of the work W. The received amount transfer part 127 subtracts the creator's receiving amount from the balance of the virtual currency associated with the grantor, and adds the creator's receiving amount to the balance of the virtual currency associated with the person or management organization designated by the creator of the work, on the condition that the hash value of the work owned by the present owner matches the hash value stored in the blockchain. In this way, the transaction management system S according to Variation Example 4 can ensure that the exploitation right is established for the original work W that has not been altered.

<Variation Example 5>

The owner of the work W may establish an exploitation right for others. Here, if the exploitation right holder who has been granted the exploitation right of the work W can further grant the exploitation right of the work W to others, it is advantageous for the owner of the work W, as the usage of the work W spreads by itself, without any direct effort of the owner. On the other hand, in some cases, the owner of the work W does not want the usage of the work W to spread without limitation and wants to control the usage by himself/herself.

Therefore, a transaction management system S according to Variation Example 5 can establish "a negotiation right" which is a right for a user participating in the distributed database D to establish the exploitation right for another user. Only the user for whom the negotiation right is established can establish the exploitation right for another user. In addition, only the owner of the work W or the person or management organization designated by the owner of the work W can carry out an establishment and cancellation of the negotiating right.

Figure 11:
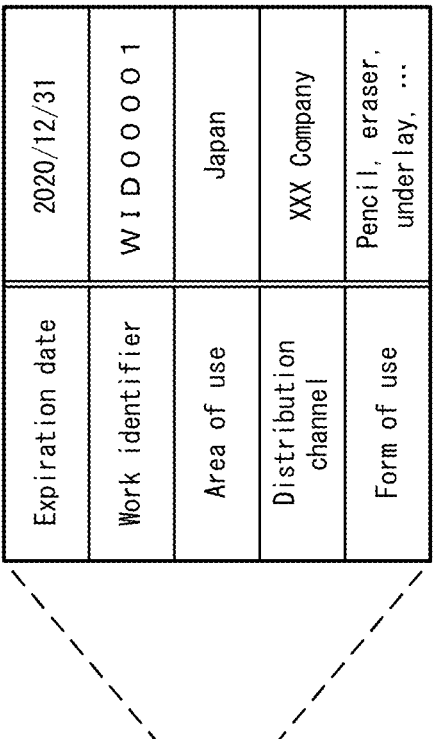
FIG. 11 is a schematic diagram showing a data structure of a negotiation right database for storing the presence or absence of a negotiation right.

FIG. 11 is a schematic diagram showing a data structure of a negotiation right database for storing the presence or absence of the negotiation right. The negotiation right database is stored in the work management system M and managed by the user registration server.

The user identifier is assigned to each user participating in the distributed database D. As shown in FIG. 11, the negotiation right database stores the user identifier and information indicating whether or not the negotiation right is established for the user identified by the user identifier in association with each other. Further, when the information indicating that the negotiation right is established is stored, the following are also stored: a validity period of the negotiation right, a work identifier for specifying the work to be negotiated, an area of use in which the exploitation right can be established, the distribution channel of the exploitation right, and the form of use of the exploitation right.

It should be noted that if the work for which the exploitation right is to be established is a work created as a single piece of work such as a painting, sculpture, etc., an integrated circuit (IC) tag storing a work identifier may be attached to the work and used as the work identifier of the work. In addition, if the work for which the exploitation right is to be established is digital art composed of digital information or three-dimensional information representing an internal space of a structure, information indicating the work identifier may be embedded in the work using a digital watermark. As a result, the user having the negotiation right can confirm at the time of negotiation whether or not the work identifier stored in the negotiation right database matches the work identifier to be negotiated.

In the case shown in FIG. 11, the user whose user identifier is UID00001 is the owner of the work W. Therefore, the user whose user identifier is UID00001 can establish the negotiation right for another user or cancel the negotiation right of the user for whom the negotiation right is established. Further, the negotiation right is not established for a user whose user identifier is UID00002, and the negotiation right is established for a user whose user identifier is UID0XXXX.

The license information linking part 128 acquires, prior to linking information relating to a new exploitation right to the blockchain acquired by the acquisition part 120, a user identifier of the grantor included in the information relating to the exploitation right. The license information linking part 128 acquires whether or not the negotiation right is established for the grantor by inquiring the negotiation right database on the basis of the acquired user identifier. When the negotiation right is not established for the grantor, the license information linking part 128 stops the linking of the information relating to the new exploitation right.

As a result, the transaction management system S according to Variation Example 5 can provide a system in which the owner of the work W controls the establishment of the exploitation right of the work W.

<Variation Example 6>

Cases where establishing the exploitation right of the work W were explained above. This assumes that the exploitation right holder who has been granted the exploitation right immediately exercises the exploitation right. In addition, "exploitation right exercise information" that establishes the timing of exercise of the exploitation right may be added to the information related to the exploitation right. In other words, the exploitation right exercise information is a stock option for the exploitation right.

Specifically, the exploitation right exercise information includes "exercise contents," "exercise conditions," "exercise fee," "exercise period," and "exercise status." Here, the following are defined: the "exercise contents" are contents to be exercised; the "exercise conditions" are conditions to be exercised; the "exercise fee" is a fee for exercising the exploitation right; the "exercise period" is a period that limits the exercise period; and the "exercise status" is whether or not the right has been exercised. The "exercise fee" is returned to the creator of the work W at the time when the exploitation right holder exercises the exploitation right during the exercise period.

As a result, the user participating in the distributed database D acquires the exploitation right when the exploitation right of a certain work W is available at a low price, and can determine the timing of the exercise anytime within the period established by the exploitation right exercise information.

What is claimed is:

1. A transaction management method performed by a processor, the processor executes:
    acquiring a blockchain in which a plurality of blocks are linked, the blocks store (i) creator information for identifying a creator of a work, (ii) rule information for establishing transaction rules of the work, (iii) information about a virtual currency used for a transaction of the work, and (iv) a transfer history of the work, and the blockchain is built on a communication network;
    specifying a current owner of the work from the transfer history;
    specifying an assignee of the work;
    accepting, from the creator of the work, a designation of a person or management organization which receives a payment of a creator's receiving amount, which is an amount obtained by multiplying a transfer price of the work by a ratio established in the transaction rules;
    changing a remittee established in a beneficiary's profit remittance clause, which establishes a remittance of the creator's receiving amount and is included in the rule information, to the person or management organization which receives the payment of the creator's receiving amount designated by the creator;
    adding information for specifying the current owner to assignor information for specifying an assignor and adding a new transfer history, in which information for specifying the assignee is added as assignee information, to the blockchain, on the condition that the transaction rules which establish procedures of (i) subtracting the creator's receiving amount, which is the amount obtained by multiplying the transfer price of the work by the ratio established in the transaction rules, from a balance of the virtual currency associated with the assignee and (ii) adding the creator's receiving amount to a balance of the virtual currency associated with the person or management organization designated by the creator of the work are executed; and
    broadcasting, via the communication network, a blockchain to which the transfer history of ownership of the work is added to a plurality of terminals participating in an update of the blockchain.

2. The transaction management method according to claim 1, wherein
    the blockchain further stores information associated with the work, and
    the transaction management method further causes a computer of the assignee to execute displaying the information on a display part.

3. The transaction management method according to claim 1, wherein
    the work is digital art, and the blockchain further stores a hash value of the work, and
    the adding adds the information for specifying the current owner to the assignor information for specifying the assignor and adds the new transfer history, in which the information for specifying the assignee is added as the assignee information, to the blockchain, on the condition that the hash value of the work owned by the current owner matches the hash value stored in the blockchain.

4. The transaction management method according to claim 1, wherein
the adding stops transactions of (i) adding the information for specifying the current owner to the assignor information for specifying the assignor and (i) adding the new transfer history added as the assignee information for specifying the assignee to the blockchain if at least one of the following conditions is satisfied: the balance of the virtual currency associated with the assignee of the work is less than the transfer price of the work; the virtual currency associated with the current owner cannot be specified; and the virtual currency associated with the person or management organization designated by the creator of the work cannot be specified.

5. A communication terminal capable of communicating with a plurality of terminals via a communication network, comprising:
an acquisition part that acquires a blockchain in which a plurality of blocks are linked, the blocks store (i) creator information for identifying a creator of a work, (ii) rule information for establishing transaction rules of the work, (iii) information about a virtual currency used for a transaction of the work, and (iv) a transfer history of the work, and the blockchain is built on the communication network;
a specification part that specifies a current owner of the work from the transfer history and specifies an assignee of the work;
a transfer executing part that adds information for specifying the current owner to assignor information for specifying an assignor and adds a new transfer history in which information for specifying the assignee is added as assignee information to the blockchain when procedures in accordance with the transaction rules are executed; and
a history spreading part that broadcasts, via the communication network, a blockchain, to which the transfer history of ownership of the work is added, to a plurality of terminals participating in an update of the blockchain, wherein
the transaction rules include a beneficiary's profit remittance clause that establishes a remittance of a creator's receiving amount, which is an amount obtained by multiplying a transfer price of the work by a ratio established in the transaction rules, to a person or management organization, which is a payment destination of the creator's receiving amount, designated by the creator of the work, and
the transfer executing part accepts a designation of the person or management organization which receives a payment of the creator's receiving amount, and adds the new transfer history to the blockchain if the transaction rules which establish procedures of (i) subtracting the creator's receiving amount from a balance of the virtual currency associated with the assignee and (ii) adding the creator's receiving amount to a balance of the virtual currency associated with the person or management organization designated by the creator of the work are executed.

6. A method of exploitation right management performed by a processor that can communicate with a plurality of terminals via a communication network, and the processor executes:
acquiring a blockchain in which a plurality of blocks are linked, the blocks store (i) creator information for identifying a creator of a work, (ii) rule information for establishing transaction rules of the work, (iii) information relating to a virtual currency used for a transaction of the work, and (iv) a transfer history of the work and information relating to an exploitation right which is a right established for the work and allows others to use the work, and the blockchain is built on the communication network; and;
linking information relating to a new exploitation right to the blockchain, wherein
the information relating to the exploitation right includes information of a grantor who granted the exploitation right, and the processor further executes:
specifying, from the information relating to the exploitation right, a grantor and a license fee of the exploitation right established for the work;
subtracting a creator's receiving amount, which is an amount obtained by multiplying the license fee by a ratio established in the transaction rules, from a balance of the virtual currency associated with the grantor, and adding the creator's receiving amount to a balance of the virtual currency associated with a person or management organization designated by the creator of the work, in accordance with the transaction rules established in the rule information;
accepting, from the creator of the work, a designation of a person or management organization which receives a payment of the creator's receiving amount; and
changing a remittee established in a beneficiary's profit remittance clause, which establishes a remittance of the creator's receiving amount and is included in the rule information, to the person or management organization which receives the payment of the creator's receiving amount designated by the creator.

7. The method of exploitation right management according to claim 6, wherein the information relating to the exploitation right further includes information of an exploitation right holder for whom the exploitation right has been established, the date and time of establishment of the exploitation right, an establishment period of the exploitation right, an area of use of the exploitation right, a distribution channel of the exploitation right, and a form of use of the exploitation right, and
the linking prohibits linking of information relating to the new exploitation right if all of the establishment period of the exploitation right, the area of use of the exploitation right, the distribution channel of the exploitation right, and the form of use of the exploitation right included in the information relating to the exploitation right to be newly linked overlap with all of the establishment period of the exploitation right, the area of use of the exploitation right, the distribution channel of the exploitation right, and the form of use of the exploitation right included in any piece of the information relating to the exploitation right already linked to the blockchain acquired by the acquiring.

8. The method of exploitation right management according to claim 6, wherein the work is digital art, and the blockchain further stores a hash value of the work, the processor further executes specifying a current owner of the work from the transfer history, and
the adding subtracts the creator's receiving amount from a balance of the virtual currency associated with the grantor and adds the creator's receiving amount to a balance of the virtual currency associated with the person or management organization designated by the creator of the work, on the condition that the hash value of the work owned by the current owner matches the hash value stored in the blockchain.

9. A communication terminal capable of communicating with a plurality of terminals via a communication network, comprising:

an acquisition part that acquires a blockchain in which a plurality of blocks are linked, the blocks store (i) creator information for identifying a creator of a work, (ii) rule information for establishing transaction rules of the work, (iii) information relating to a virtual currency used for a transaction of the work, and (iv) a transfer history of the work and information relating to an exploitation right which is a right established for the work and allows others to use the work, and the blockchain is built on the communication network; and a license information linking part that links information relating to a new exploitation right to the blockchain, wherein the information relating to the exploitation right includes information of a grantor who granted the exploitation right and a license fee of the exploitation right, and the communication terminal further comprises:

a license information specification part that specifies, from the information relating to the exploitation right, a grantor and a license fee of the exploitation right established for the work; and a received amount transfer part that subtracts a creator's receiving amount, which is an amount obtained by multiplying the license fee by a ratio established in the transaction rules, from a balance of the virtual currency associated with the grantor, and adds the creator's receiving amount to a balance of the virtual currency associated with a person or management organization designated by the creator of the work, in accordance with the transaction rules established in the rule information, wherein the received amount transfer part accepts, from the creator of the work, a designation of a person or management organization which receives a payment of the creator's receiving amount and changes a remittee established in a beneficiary's profit remittance clause, which establishes a remittance of the creator's receiving amount and is included in the rule information, to the person or management organization which receives the payment of the creator's receiving amount designated by the creator.

\* \* \* \* \*